United States Patent
Stone

[11] 3,834,196
[45] Sept. 10, 1974

[54] BICYCLE LOCK
[76] Inventor: Richard W. Stone, 7235 17th Ave., South, Minneapolis, Minn. 55423
[22] Filed: Nov. 1, 1972
[21] Appl. No.: 302,754

[52] U.S. Cl.............. 70/18, 70/227, 70/233
[51] Int. Cl..... B60r 25/00, B62h 5/14, E05b 71/00
[58] Field of Search......... 70/15, 18, 226, 227, 233, 70/16

[56] References Cited
UNITED STATES PATENTS

| | | | |
|---|---|---|---|
| 1,343,709 | 6/1920 | Chapman | 70/18 |
| 1,444,161 | 2/1923 | Arnold | 70/18 |
| 3,600,912 | 8/1971 | Foreman | 70/77 |

FOREIGN PATENTS OR APPLICATIONS

| | | | |
|---|---|---|---|
| 10,415 | 5/1891 | Great Britain | 70/227 |
| 925,298 | 3/1947 | France | 70/233 |
| 146,738 | 7/1920 | Great Britain | 70/18 |
| 185,480 | 8/1922 | Great Britain | 70/18 |

*Primary Examiner*—Robert L. Wolfe
*Attorney, Agent, or Firm*—John W. Adams

[57] ABSTRACT

This is a bicycle lock specifically designed to be locked around the wheel of a bicycle to prevent rotation thereof and having sufficiently large cross sectional dimensions to prevent any portion thereof from being received between the jaws of a lever action cutter tool.

5 Claims, 3 Drawing Figures

PATENTED SEP 10 1974

3,834,196

BICYCLE LOCK

In recent years the theft of bicycles has become a major problem in the U.S. and many foreign countries. Statistics show that by far the greatest number of bicycles are stolen by first cutting the chain or lock with an extremely powerful hand operated lever action bolt cutter tool and then riding off on the bicycle. This operation is usually conducted by two individuals, the first one approaching the bicycle and cutting the lock arrangement (chain or other type of lock) and the second individual then getting on the bicycle and riding away. The operation requires the speed, portability, and relative silence of a bolt cutter as opposed to a saw or cutting torch.

A device which makes it impossible to use a hand operated bolt cutter type tool will prevent most of the bicycle thefts presently being carried out so successfully. The jaws of powerful lever type bolt cutter type tools must of necessity be relatively short in order to provide the high mechanical advantage and force required to cut through the hardened steel chains and locks presently being used. The short jaws therefore cannot be spread apart a great distance (less than ¾ inch in the case of conventional 36 inch cutters) and therefore the use of a locking mechanism having sufficiently large cross sectional dimensions to positively prevent the same from being received between the cutting jaws of the cutter tool will make it impossible for a thief to cut through the lock with such a tool.

It is therefore the principal object of this invention to provide a bicycle lock which will prevent rotation of a bicycle wheel and which is specifically designed to prevent cutting thereof by using a hand operated lever action tool.

More specifically it is an object to provide such a bicycle lock made in the form of two pivotally connected segments adapted to be closed around the rim and tire of a bicycle wheel with locking means for holding the same in closed position, both of said segments having sufficiently large cross sectional dimensions to prevent insertion between the jaws of a lever action cutter tool.

These and other objects and advantages of this invention will more fully appear from the following description made in connection with the accompanying drawings, in which, like reference characters refer to similar parts throughout the several views, and, in which.

Figure 1:
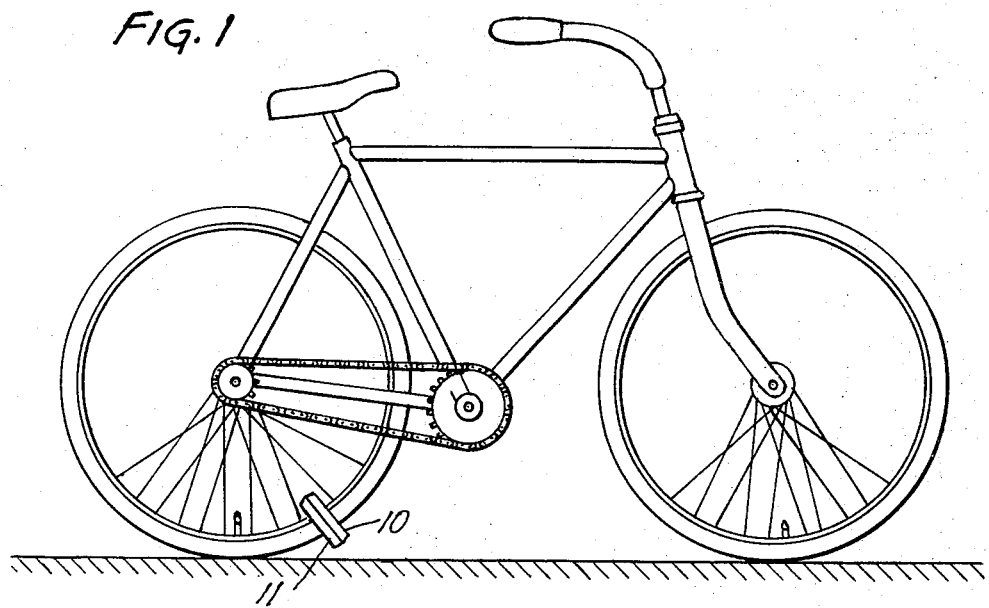
FIG. 1 is a side elevational view showing a bicycle with my lock mounted in operative locked position on the rear wheel thereof.
Figure 2:
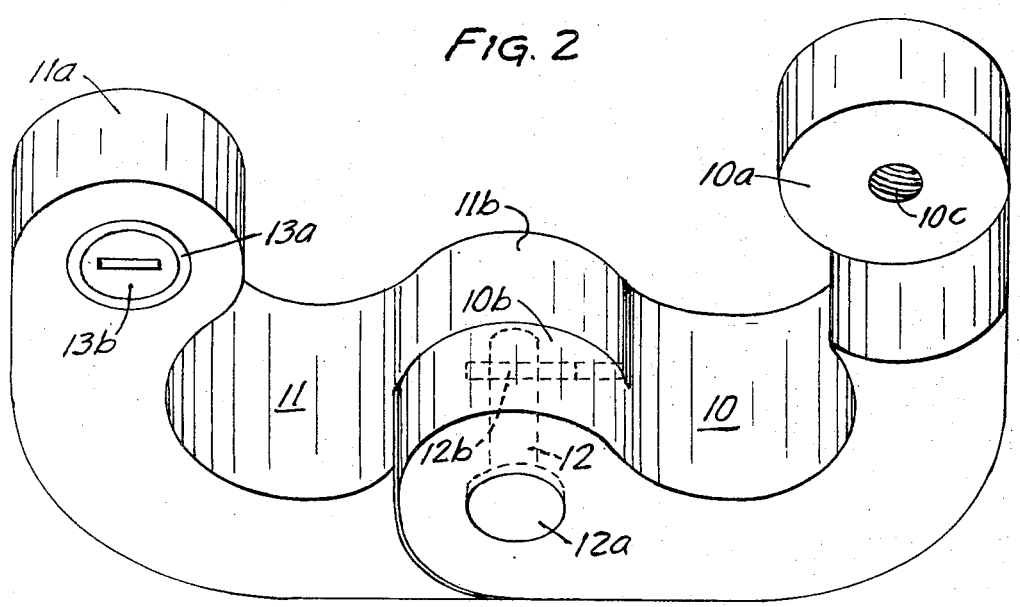
FIG. 2 is a perspective view showing the two segments of the lock in open position; and, FIG. 3 is a front elevational view of the lock in closed position with portions broken away.
Figure 3:
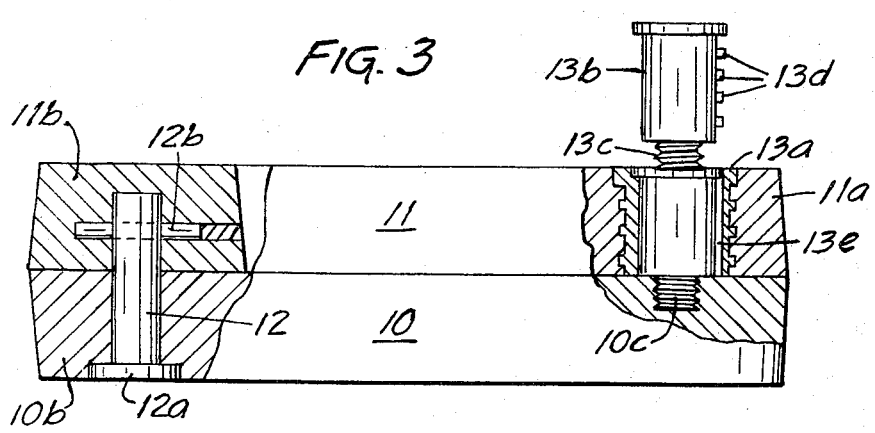

The lock mechanism illustrated embodies a pair of generally similar sections 10 and 11. The main body portion of each of the sections is curved to define an opening therethrough adapted to receive and surround the wheel and tire of a bicycle. The ends of each section are reduced in thickness to provide mating attachment end portions respectively designated by the numerals 10a and 10b and 11a and 11b respectively. The attachment portions 10b and 11b are pivotally connected as by the pivot pin 12 extending through portion 10b and into the portion 11b. The head 12a of the pin 12 is recessed in the portion 10b and the pin is secured to attachment portion 11b as by the pressed fit roll pin 12b which is positioned to be concealed when the segments are closed.

Suitable means for locking the other end portions 10a and 11a together may be provided such as the key type lock mounted in a suitable casing 13a which in the form shown is positively anchored to the attachment portion 11a. In the form of the lock illustrated a rotatable core member 13b is received within the casing 13a and has a threaded portion 13c fixed to the inner end thereof for threaded connection with a tapped hole 10c formed in the attachment portion 10a. Suitable means for normally preventing rotation of the core member 13b in its casing 13a are provided such as the spring biased slide or tumbler members 13d normally projected into a keyway 13e formed in said casing 13a. When the proper key is inserted into the core 13 the slides 13d are retracted from the keyway 13e and permit the threaded locking pin 13c to be removed from its threaded connection in hole 10c. The casing is fixed in the attachment portion 11a as by having a pressed fit therewith and the spring biased locking slides or tumblers 13d and mating keyway 13e of casing 13a are of conventional design. The locking arrangement provided by the lock 13 affords a simple yet effective means for positively securing the mating attachment portions 10a and 11a together to positively lock the same in closed position. The core 13b is positively held against rotation by the slides 13d which are spring pressed into the keyway 13e until a key of the proper configuration is inserted into the key slot. As previously stated the key then retracts the slides 13d from the keyway 13e and permits rotation of the threaded locking pin 13c into or out of the threaded opening 10c.

The cross sectional thickness of the body of the two segments 10 and 11 is sufficiently large to prevent the same from being received between the jaws of a bolt cutter type tool. In practice this thickness must be at least 1 inch but no more than 1⅝ inches to permit the segments to be inserted between the spokes of a conventional bicycle wheel.

It will be seen that I have provided an extremely simple and relatively inexpensive bicycle lock which is specifically constructed to prevent rotation of a bicycle wheel and to prevent the lock from being cut with a lever type cutter. For the reasons stated herein this will greatly reduce the number of thefts and thus aid materially in solving this serious problem.

It will, of course, be understood that various changes may be made in the form, details, arrangement and proportions of the parts without departing from the scope of this invention as set forth in the appended claims.

What is claimed is:

1. A wheel-surrounding bicycle lock unit comprising;

a pair of generally semi-circular similar locking segments each having mating overlapping end portions of reduced thickness and forming a body defining a wheel-surrounding opening therethrough when said segments are in closed position, the cross sectional dimensions of said segments when in wheel-surrounding locking position being sufficiently large to prevent the same from being received between the open jaws of a lever action bolt cutter and the cross sectional dimensions of at least a portion of the segments being sufficiently small to pass between the spokes of a bicycle wheel, a pivot pin connecting the mating overlapped end portions at one end of said segments to permit said segments to be opened to provide access to said opening and permit a bicycle wheel to be received therein, and locking means mounted in the mating portion of one segment at the other end thereof and having a locking element disposed in generally parallel relation to said pivot pin and projectable into the adjacent overlapping mating portion of the other segment for securing the two segments of the body together when in closed wheel-surrounding locking position.

2. The structure set forth in claim 1 wherein the minimum cross sectional dimension of said segments when in closed position is at least 1 inch and the maximum cross sectional dimension of the portion passing between the spokes of the bicycle wheel being no greater than 1 5/8 inches.

3. The structure set forth in claim 1 and said locking means including a threaded locking element threadably connecting adjacent portions of said segments when in closed position with means permitting rotation of said locking element only when unlocked.

4. The structure set forth in claim 3 and said means permitting rotation of the locking element comprising a key actuated mechanism having retractable anti-rotation locking elements permitting rotation of said threaded portion only when a key of the proper configuration is inserted into said mechanism.

5. The structure set forth in claim 1 and said locking means including, a threaded opening in the other ends of one of said segments, a lock casing having a cylindrical chamber therein and fixed to said other end of the other said segments, and axially aligned with the threaded opening of the other segment when in closed position, and having a keyway in the wall of said chamber, a lock core having an axially oriented key opening and a plurality of spring biased tumblers mounted transversely of said opening and normally urged into said casing keyway to prevent rotation of said core unless a key of the proper configuration is inserted into said opening to retract said tumblers from said keyway, a threaded locking element extending axially inwardly of said lock core and fixed thereto for projection into the threaded opening of the other segment aligned therewith when said segments are in closed position.

* * * * *